(12) United States Patent
Ouellette

(10) Patent No.: US 6,612,785 B1
(45) Date of Patent: Sep. 2, 2003

(54) BOTTLE GUIDE RAILS WITH AIR FLOW OPENINGS

(75) Inventor: Joseph F. Ouellette, St. Louis, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 324 days.

(21) Appl. No.: 09/467,577

(22) Filed: Dec. 20, 1999

Related U.S. Application Data

(63) Continuation-in-part of application No. 09/239,614, filed on Jan. 29, 1999, now Pat. No. 6,360,880.

(51) Int. Cl.⁷ .............................................. B65G 53/16
(52) U.S. Cl. ...................................... 406/88; 198/836.3
(58) Field of Search ........................ 198/836.3; 406/86, 406/88

(56) References Cited

U.S. PATENT DOCUMENTS

| | | | | |
|---|---|---|---|---|
| 3,292,772 A | * | 12/1966 | Rice | |
| 3,734,567 A | * | 5/1973 | Fong | 406/86 |
| 3,874,497 A | * | 4/1975 | Carlson | 198/836.3 |
| 4,216,855 A | * | 8/1980 | Raudat | 198/633 |
| 4,822,214 A | * | 4/1989 | Aidlin et al. | 406/86 |
| 4,828,434 A | * | 5/1989 | Fairman et al. | 406/88 |
| 5,147,153 A | * | 9/1992 | Aidlin et al. | 406/86 |
| 5,170,879 A | * | 12/1992 | Smith | 198/452 |
| 5,322,160 A | * | 6/1994 | Markiewicz et al. | 198/836.3 |
| 5,549,423 A | * | 8/1996 | Lenhart | 406/86 |
| 5,695,302 A | * | 12/1997 | Hilbish | 406/88 |
| 5,820,306 A | * | 10/1998 | Hilbish et al. | 406/88 |
| 6,042,307 A | * | 3/2000 | Lenhart | |

* cited by examiner

Primary Examiner—Christopher P. Ellis
Assistant Examiner—Richard Ridley
(74) Attorney, Agent, or Firm—Thompson Coburn, LLP

(57) ABSTRACT

A two axis bottle guide rail change over apparatus for an air conveyor supports a pair of guide rails and is operable to simultaneously adjust a lateral spacing between the pair of guide rails and/or simultaneously adjust a vertical positioning of the pair of guide rails relative to the air conveyor.

15 Claims, 5 Drawing Sheets

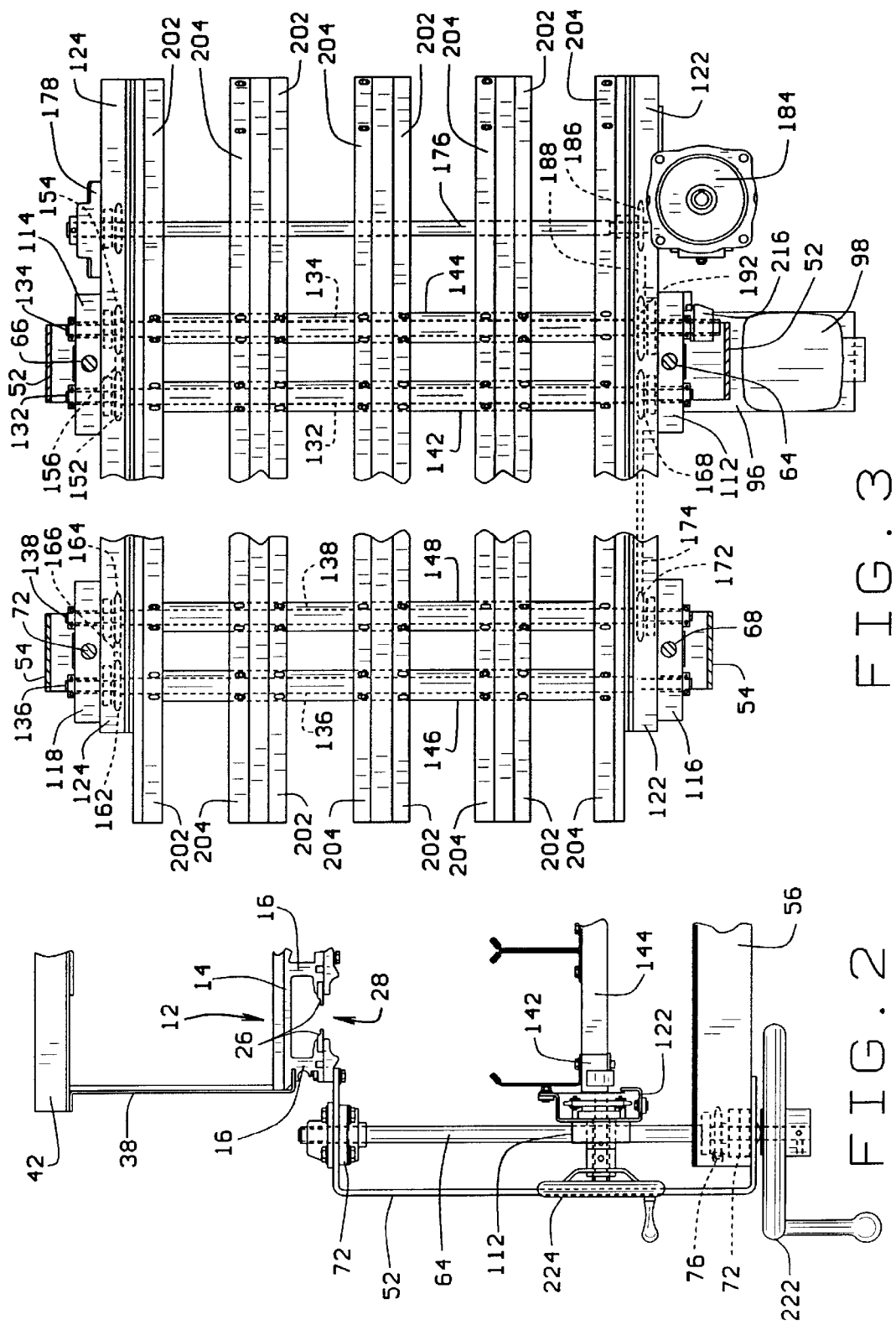

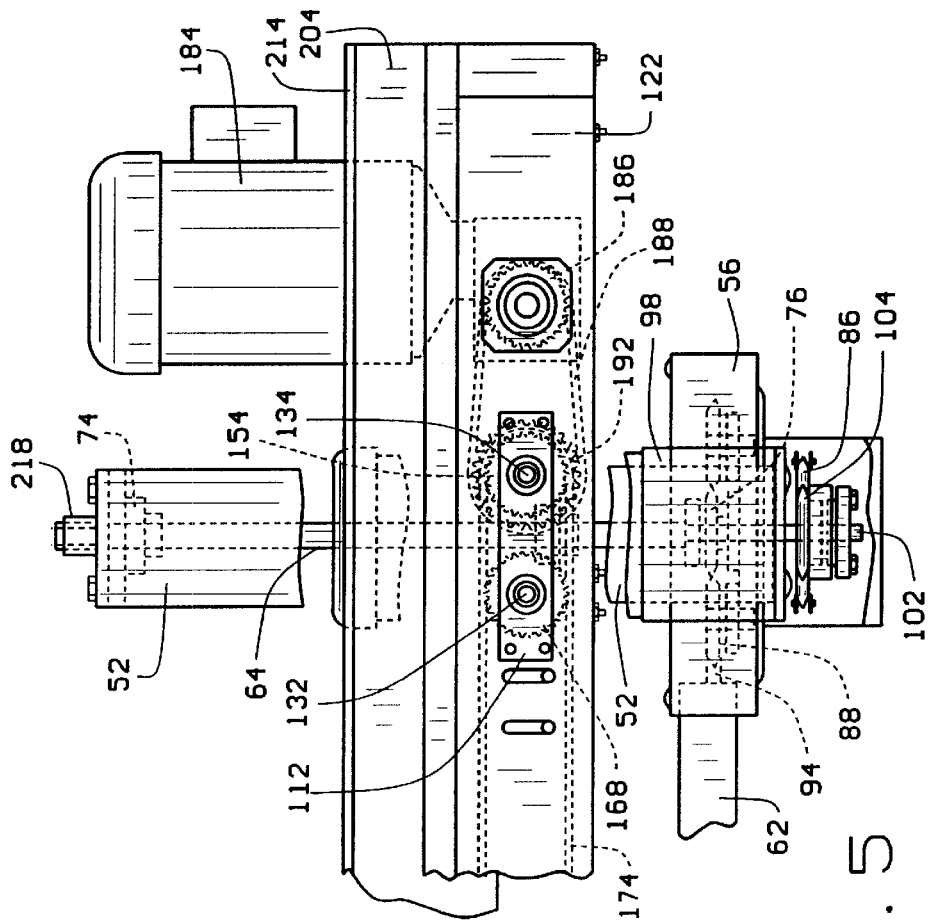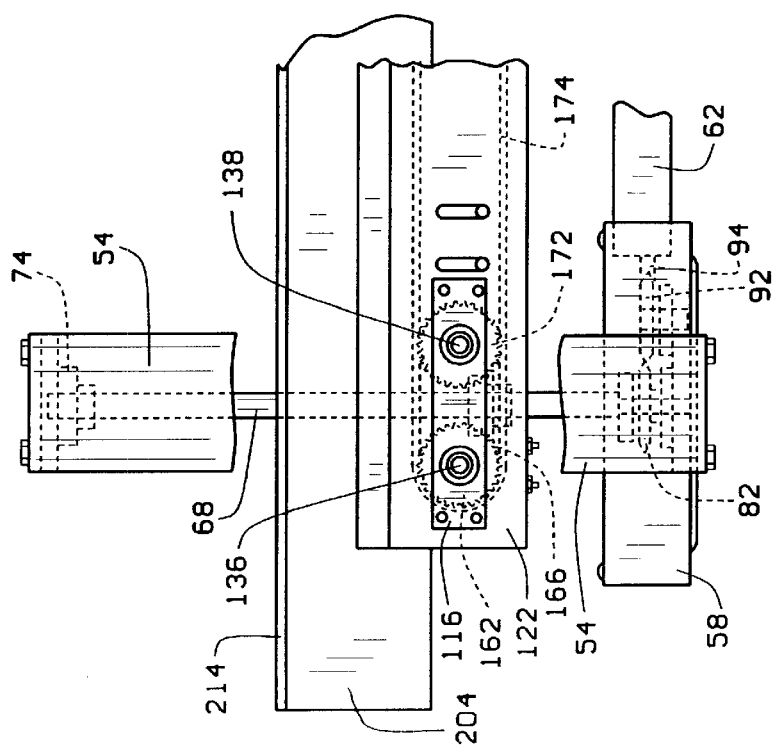
FIG. 5

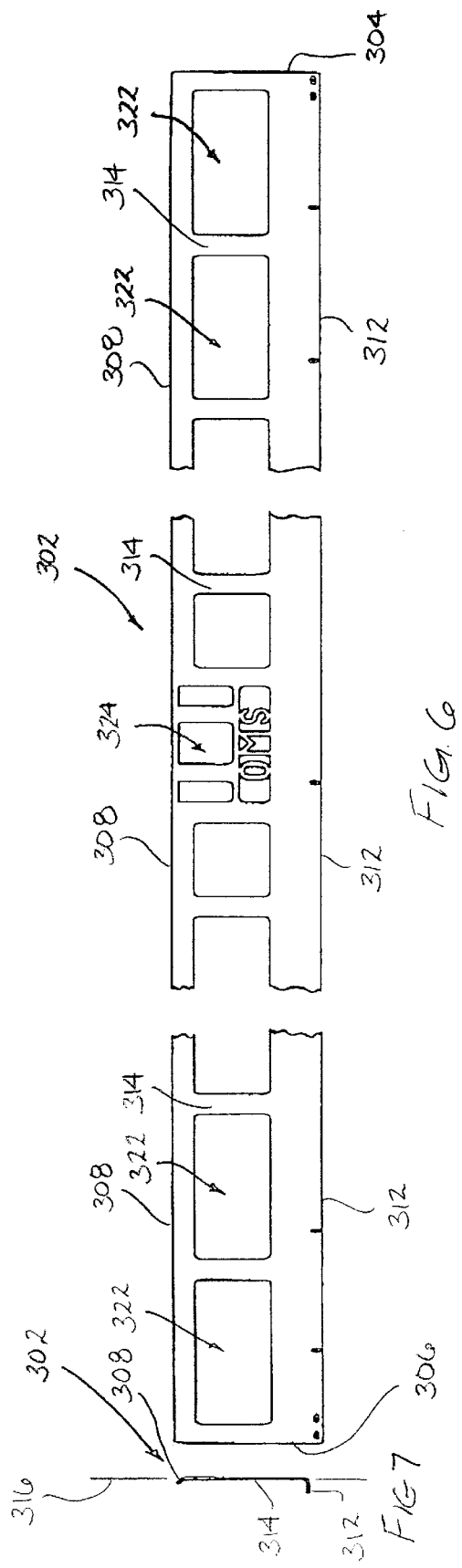

BOTTLE GUIDE RAILS WITH AIR FLOW OPENINGS

This is a continuation-in-part application of application Ser. No. 09/239,614, filed Jan. 29, 1999 U.S. Pat. No. 6,360,880 and presently pending.

BACKGROUND OF THE INVENTION (1) Field of the Invention

The present invention pertains to an apparatus that adjusts the positions of a pair of guide rails of a conveyor. In particular, the present invention pertains to an apparatus that supports a pair of bottle air conveyor guide rails and is operable to simultaneously adjust a lateral spacing between the pair of guide rails and/or simultaneously adjust a vertical positioning of the pair of guide rails relative to the air conveyor.

(2) Description of the Related Art

Air conveyors are employed in the rapid transport of empty plastic bottles of the type having an annular rim or a neck ring at the base of the bottle neck. A typical air conveyor includes a pair of flanges that are spaced from each other defining an elongated slot between the flanges. The spacing between the flanges is sufficiently large to enable a portion of the bottle just below the neck ring to pass through the spacing with the bottle suspended from the top surfaces of the flanges by the neck ring engaging over the top surfaces. A series of air ducts are positioned along the flanges above and/or below the elongated slot. A plenum of the air conveyor supplies a flow of air to the air ducts. The air ducts are oriented so that the air ejected from the ducts will contact the plastic bottles pushing the bottles along the pathway defined by the elongated slot with the neck ring of the bottles sliding along the top surfaces of the spaced flanges.

Preferably, air conveyors transport bottles in closely spaced succession and at a substantial speed. A typical air conveyor is constructed with both straight sections and curved sections in order to transport the succession of bottles from one area to another. Air conveyors often have guide rails positioned below the slot defined by the pair of flanges. Pairs of guide rails positioned on opposite sides of the slot follow the conveyor path defined by the slot. The guide rails are usually spaced further apart from each other than are the flanges to allow the width of a bottle suspended from the flanges to pass easily between the guide rails. The guide rails limit the side-to-side movement of the succession of bottles conveyed by the air conveyor and thereby limit the extent to which the body of a bottle can swing outwardly or transversely from the air conveyor path and thereby avoids a bottle neck or neck ring potentially becoming jammed in the air conveyor slot and stopping the succession of conveyed bottles.

The positioning of the pair of guide rails relative to the air conveyor slot is determined by the size and shape of the bottle to be conveyed by the air conveyor. The pair of guide rails are spaced a lateral distance from each other that is slightly larger than the width of the bottle to be conveyed along the longitudinal length of the air conveyor. The guide rails are centered laterally relative to the center of the air conveyor slot so that the spacing of the pair of guide rails from laterally opposite sides of the bottle is substantially equal. In addition, the pair of guide rails are positioned vertically relative to the air conveyor slot so that they are positioned on opposite lateral sides of a portion of the bottle having the bottle's greatest width.

The pair of guide rails are supported beneath the air conveyor slot by a frame that is either supported on a floor beneath the air conveyor or is suspended from the air conveyor. The pair of guide rails are often supported on the frame by brackets that are adjustably connected to the guide rails and adjustably connected to the frame. For example, the guide rails can be attached by screw threaded fasteners to the brackets where the fasteners can be loosened to enable manual adjustment of the vertical positions of the guide rails relative to the brackets and relative to the air conveyor. The fasteners are then tightened to secure the guide rails in their vertically adjusted positions. In addition, the brackets could be attached by screw threaded fasteners to the frame where the fasteners can be loosened to enable manual adjustments to the lateral spacing between the brackets and the pair of guide rails, and then tightened to secure the brackets and guide rails in their laterally adjusted positions.

However, manually adjusting the lateral spacing between a pair of guide rails and the vertical position of a pair of guide rails relative to an air conveyor involves a significant amount of time. All of the fasteners on all of the brackets along the length of the conveyor must be loosened, the adjustments made, and all the fasteners tightened. The time required for these adjustments is further increased depending on the length of the conveyor system. If the conveyor system is being changed from conveying plastic bottles having a smaller diameter to those having a larger diameter, the lateral spacing between the guide rails must be adjusted to a larger spacing while maintaining the pair of guide rails centered beneath the conveyor slot. These adjustments must be made along the entire length of the air conveyor. Furthermore, if the conveyor is being changed over from conveying bottles having a smaller vertical height to conveying bottles having a larger vertical height, the vertical positions of the guide rails relative to the air conveyor may also need to be adjusted. Again, these adjustments must be made along the entire length of the air conveyor system which could take a considerable amount of time. Still further, in multiple conveyor systems where there are a plurality of air conveyor slots arranged side by side, the adjustments must be made to the pairs of guide rails for each of the conveyor slots, thus multiplying the time required for the adjustments. Making all of these adjustments to the guide rails of the air conveyor system results in a considerable amount of down time of the air conveyor.

The problem of the considerable down time needed to adjustably position guide rails of an air conveyor would be overcome by an apparatus that is capable of simultaneously adjusting the lateral spacing between pairs of guide rails and/or simultaneously adjusting the vertical positions of the guide rails relative to the air conveyor.

SUMMARY OF THE INVENTION

The two axis guide rail change over apparatus of the invention can be employed with virtually any type of conveyor system that conveys a succession of articles along a longitudinal conveyor path, where any lateral side-to-side movement of the succession of articles is limited by a pair of longitudinally extending guide rails positioned on laterally opposite sides of the conveyor path. In the operative environment of the guide rail change over apparatus to be described, the apparatus is employed on an air conveyor that transports plastic bottles. The bottles are of a conventional type with each bottle having a neck at its upper end and an annular shoulder below the neck that defines the upper portion of the body of the bottle. An outwardly projecting annular rim or neck ring is positioned below the neck of the bottle and above the bottle shoulder.

The air conveyor with which the guide rail change over apparatus of the invention is described is a multi-channel air conveyor where each channel of the conveyor employs a pair of flanges through which the neck and neck ring of the bottle project. The neck ring rests on top surfaces of the spaced flanges suspending the shoulder and body of the bottle below the flanges. The air conveyor includes a series of air ducts along each channel that direct a supply of air against the bottle causing the bottle to move along the length of the air conveyor with the neck ring of the bottle sliding along the top surfaces of the flanges. Air conveyors of this type are described in the U.S. Patents of Ouellette U.S. Pat. No. 5,437,521, issued Aug. 1, 1995, and U.S. Pat. No. 5,611,647, issued Mar. 18, 1997, both of which are assigned to the assignee of the present invention and incorporated herein by reference.

Air conveyors typically include a frame work that supports the conveyor. They also often include guide rails that are supported from the frame work or suspended from the air conveyor in positions just below the air conveyor slot. The guide rails are provided in pairs that extend along the longitudinal length of the conveyor. A lateral spacing between the pair of guide rails is centered below the spacing between the air conveyor flanges that define the slot. The spacing between the guide rails is slightly larger than the body of the bottles to be conveyed by the air conveyor. The guide rails limit the extent to which the bottles conveyed by the air conveyor can rock side-to-side or transversely to their direction of conveyance.

The two axis guide rail change over apparatus of the invention is designed to enable its simple addition to an existing air conveyor system. The apparatus is designed to be substituted for the guide rails of a prior art air conveyor.

In a similar manner to prior art pairs of guide rails that are arranged end to end along the longitudinal length of an air conveyor, the pairs of two axis adjustable guide rails of the invention may also be arranged end to end along a longitudinal length of an air conveyor. In addition, the pairs of two axis adjustable guide rails may also be employed on multiple channel air conveyors in the same manner as prior art guide rail pairs.

The two axis guide rail change over apparatus is supported on a frame that is attached to a multi-channel air conveyor section and suspended below the air conveyor slots of the conveyor section. The frame supports an adjustment mechanism and the adjustment mechanism supports pairs of guide rails that are positioned beneath and laterally centered relative to the slots of the air conveyor. The adjustment mechanism is capable of laterally adjusting the guide rail pairs relative to each other as well as vertically adjusting the positions of the guide rail pairs relative to the air conveyor slots.

The adjustment mechanism includes two pairs of screw threaded rods that extend horizontally and laterally across the conveyor paths defined by the pairs of guide rails. The two pairs of lateral rods are positioned beneath the guide rails with one pair being positioned adjacent the upstream ends of the guide rails and the other pair positioned adjacent the downstream ends of the guide rails. One rod of each pair has right hand screw threading and one rod of each pair has left hand screw threading. A right hand internally screw threaded block is mounted on the right hand screw threaded rod of each pair of rods and a left hand internally screw threaded block is mounted on the left hand screw threaded rod of each pair of rods. One guide rail of each pair is secured to the two right hand screw threaded blocks at the opposite upstream and downstream ends of the guide rails and the other guide rail of each pair is secured to the two left hand screw threaded blocks at the opposite upstream and downstream ends of the guide rails.

The two pairs of lateral rods are interconnected by a chain drive system that rotates each of the rods at the same speed and in the same direction of rotation. The chain drive system is selectively driven by either a manual hand crank or an electric gear motor to rotate all of the lateral rods in a first direction of rotation or rotate all of the lateral rods in an opposite, second direction of rotation.

By rotating the rods in either the first or second directions of rotation, due to the right hand and left hand screw threading of the lateral rods of each pair, the blocks mounted on the rods will move laterally toward or away from each other. This, in turn, results in the simultaneous movement of the guide rails of each pair laterally toward and away from each other. By calibrating the number of turns of the manual handle of the chain drive system needed to move the guide rails of each pair a certain distance relative to each other, the lateral spacing between adjacent guide rails of each pair can be quickly adjusted to any desired lateral distance by rotating the handle in the appropriate direction and for the appropriate number of turns. Alternatively, by interconnecting a counter in the train drive system that calibrates the direction and number of rotations of the electric gear motor output shaft needed to adjust the lateral distance between the guide rails of each pair, the lateral spacing between the guide rails of each pair can be quickly adjusted to a desired lateral spacing.

The pairs of transverse threaded rods are received in bearing journals at their opposite ends that, in turn, are mounted on pairs of channel members. The channel members extend the longitudinal length of the conveyor section and are positioned on laterally opposite sides of the pairs of guide rails. Each of the channel members has an internally screw threaded block at its opposite upstream and downstream ends. Each of the four screw threaded blocks is mounted on one of four vertical screw threaded rods with the four blocks and the two channel members being positioned in the same horizontal plane.

The four vertical rods are interconnected by a chain drive system that drives each of the four rods at the same speed in opposite first and second directions of rotation. The chain drive system of the vertical rods is powered by a manual hand crank or an electric gear motor. The rotation of the vertical rods in opposite directions of rotation causes the four internally screw threaded blocks and the attached pair of channel members to move together vertically upwardly and downwardly relative to the air conveyor. This, in turn, causes the pairs of guide rails supported on the lateral rods, which are supported between the two longitudinal channel members, to move vertically upwardly and downwardly relative to the air conveyor channels.

As in the chain drive system for the transverse rods, the direction and number of rotations of the hand crank can be calibrated to adjustably position the pairs of guide rails at a desired vertical position relative to the air conveyor channels. Alternatively, with the transverse rods having a standard ACME thread of six threads per inch, counters are commercially available that count 0.1667 inches per revolution (or one inch per six revolutions). Such a counter can be interconnected with the chain drive system of the vertical rods to determine the direction and extent of output shaft movement needed to adjustably position the pairs of guide rails at a desired vertical position relative to the air conveyor channels.

The two axis guide rail change over apparatus of the invention provides a means of quickly and simultaneously adjusting the lateral spacing between adjacent pairs of guide rails and/or adjusting the vertical position of the pairs of guide rails relative to an air conveyor. The apparatus is equally well-suited for use with multiple channel conveyors as well as single channel conveyors.

BRIEF DESCRIPTION OF THE DRAWINGS

Further objects and features of the present invention are set forth in the following detailed description of the preferred embodiment of the invention and in the drawing figures, wherein:

FIG. 2 is a partial side elevation view of the apparatus shown in FIG. 1 with a manual hand crank drive system;

FIG. 3 is a fragmented top plan view of a portion of the apparatus of FIG. 1;

FIG. 5 is a fragmented side elevation view of a portion of the apparatus of FIG. 1;

FIG. 6 is a side elevation view of a modified guide rail; and

FIG. 7 is an end view of the guide rail of FIG. 6.

DESCRIPTION OF THE PREFERRED EMBODIMENT

Figure 1:
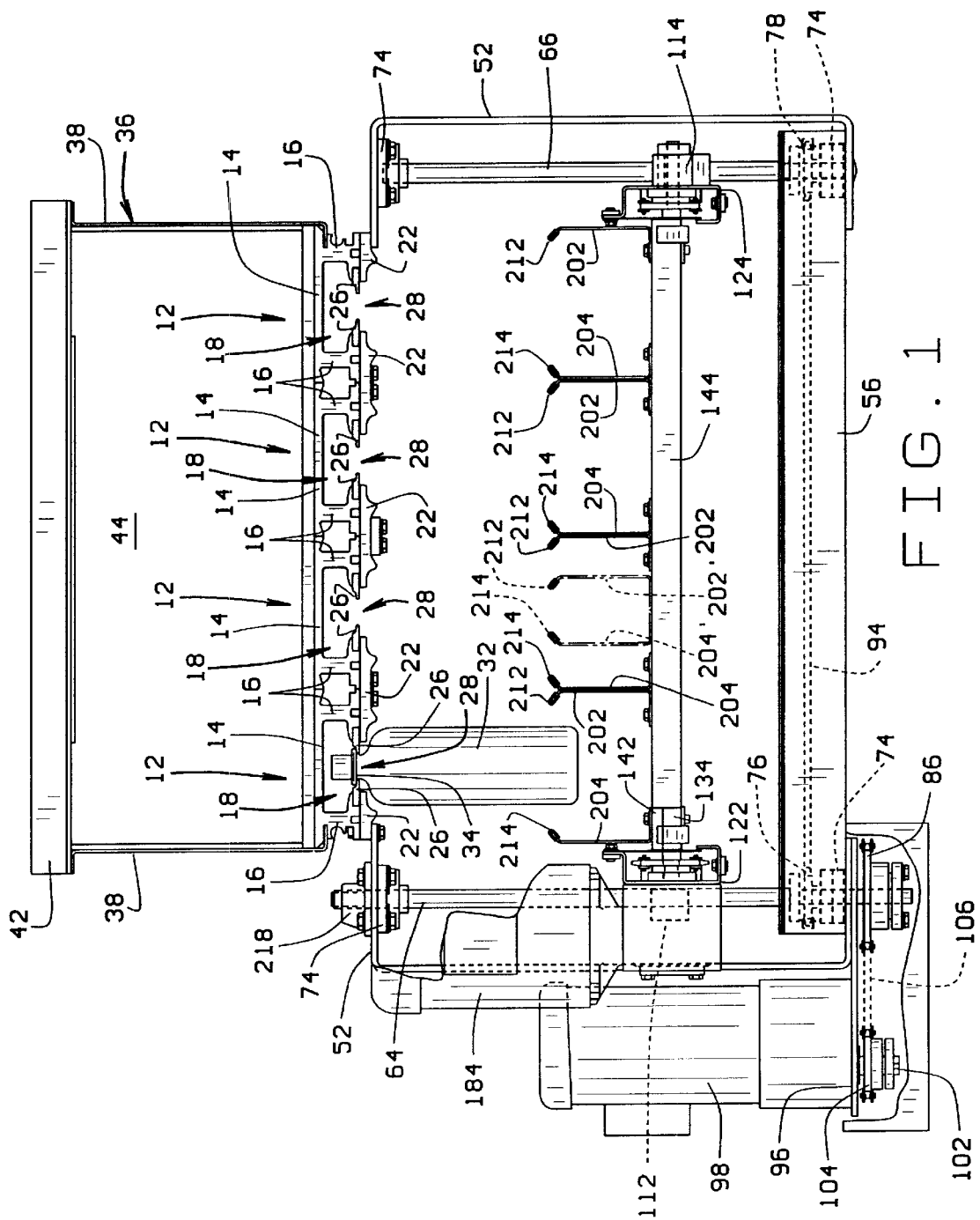
FIG. 1 is an end elevation view of a four lane air conveyor system employing the two axis guide rail change over apparatus of the invention.

FIG. 1 shows a multi-channel air conveyor that serves as the operative environment of the present invention. Although a multi-channel air conveyor is shown, it should be understood that the present invention may be employed with a single-channel air conveyor. The component parts to be described are primarily constructed of metal, although other materials such as plastic may be employed in certain component parts. The component parts are secured together by threaded fasteners, welds, or other equivalent means.

FIG. 1 shows an end elevation view of the air conveyor. The conveyor includes four conveyor channels 12, each having an inverted, generally U-shaped configuration with a top wall 14 and laterally spaced side walls 16. Together, the channel top wall 14 and the side walls 16 give each of the channels their inverted, generally U-shaped configuration surrounding an interior volume 18 of each conveyor channel. The side walls 16 of each conveyor channel have lower sections 22 connected to the side walls by threaded fasteners. The side wall lower sections 22 have pluralities of air duct outlets (not shown) that extend through the conveyor side walls 16 and the side wall lower sections 22. The configurations of the air duct outlets direct jets of air ejected from the outlets to strike bottle containers conveyed by the air conveyors in the area of the shoulder of the bottles, thereby forcing the bottles to travel downstream along the length of the air conveyor.

Each of the air duct outlets in the side wall lower sections 22 is fed with pressurized air directed through air conduits that pass through the side walls 16 of the conveyor channels. These air ducts extend from the top surface of the conveyor channel top wall 14 completely through the side wall 16 to the air duct outlets of the side wall lower sections 22. This construction of the air ducts and air conduits is employed in air conveyors of the type disclosed in the U.S. Patent of Ouellette, U.S. Pat. No. 5,628,588, issued May 13, 1997 and incorporated herein by reference.

The interior volume 18 of each of the conveyor channels 12 contains a pair of laterally spaced, longitudinally extending flanges 26. The opposed pairs of flanges 26 extend from the opposed side walls 16 of each of the conveyor channels 12 and define conveyor slots 28 between each pair of flanges. The flanges 26 are held between the upper portions of the channel side walls 16 and the lower sections 22 of the channel side walls. In a bottle conveyor of the type shown in FIG. 1, the lateral widths of the slots 28 is adjusted by adjusting the relative lateral positions of the pairs of flanges 26 to each other. Thus, the slots 28 can be adjusted to receive the neck of plastic bottles 32 of various different sizes with the annular rim or neck ring 34 of the bottle supported on the top surfaces of the pair of flanges 26 and with the body of the bottle suspended below the pair of flanges.

An air plenum 36 extends longitudinally along the top wall 14 of the conveyor channels 12. The air plenum 36 is an elongated hollow box comprised of a pair of side walls 38 and a top wall 42 that surround an interior volume 44 of the plenum. The plenum 36 receives a flow of air from a source such as a blower (not shown) and channels the air through its interior volume 44 supplying the air to the air conduits that pass through the side walls 16 of the conveyor channels and through the air ducts that pass through the side wall lower sections 22 of the conveyor channels. Although only a short, straight length of the air conveyor is shown in the drawing figures, air conveyors of this type are constructed with substantial lengths comprised of a plurality of air conveyor sections of the type described and shown arranged longitudinally, end-to-end. In addition, the air conveyor sections can curve from side-to-side and incline upwardly and downwardly along their lengths.

The air conveyor described to this point is of the type disclosed in the earlier referenced U.S. Pat. No. 5,628,588 and many of the component parts of the air conveyor described are found in various different types of air conveyors. In addition, many prior art air conveyors employ pairs of guide rails centered beneath the slots of the conveyor channels and extending along the conveyor path defined by the conveyor slots. The guide rails are usually spaced a greater lateral distance from each other than are the flanges of the conveyor channels. The lateral spacing of the pairs of guide rails is slightly larger than the width or diameter of the body of the plastic bottles conveyed by the air conveyor. The guide rails limit the movement of the bottles laterally side-to-side as the bottles are conveyed along the longitudinal length of the air conveyor.

The two axis bottle guide rail change-over apparatus of the invention replaces conventional pairs of guide rails. It should be understood that the air conveyor described is only one operative environment of the two axis bottle guide rail change-over apparatus, and that the apparatus may be employed in different types of air conveyors having constructions that are different from the construction of the air conveyor described herein. The change-over apparatus is not limited to use with the particular type of air conveyor described. Although the guide rail change-over apparatus will be described as being employed with a multi-channel air conveyor, it is equally well-suited for use with a single-channel air conveyor as well as other types of conveyors that are not air conveyors.

Figure 4:
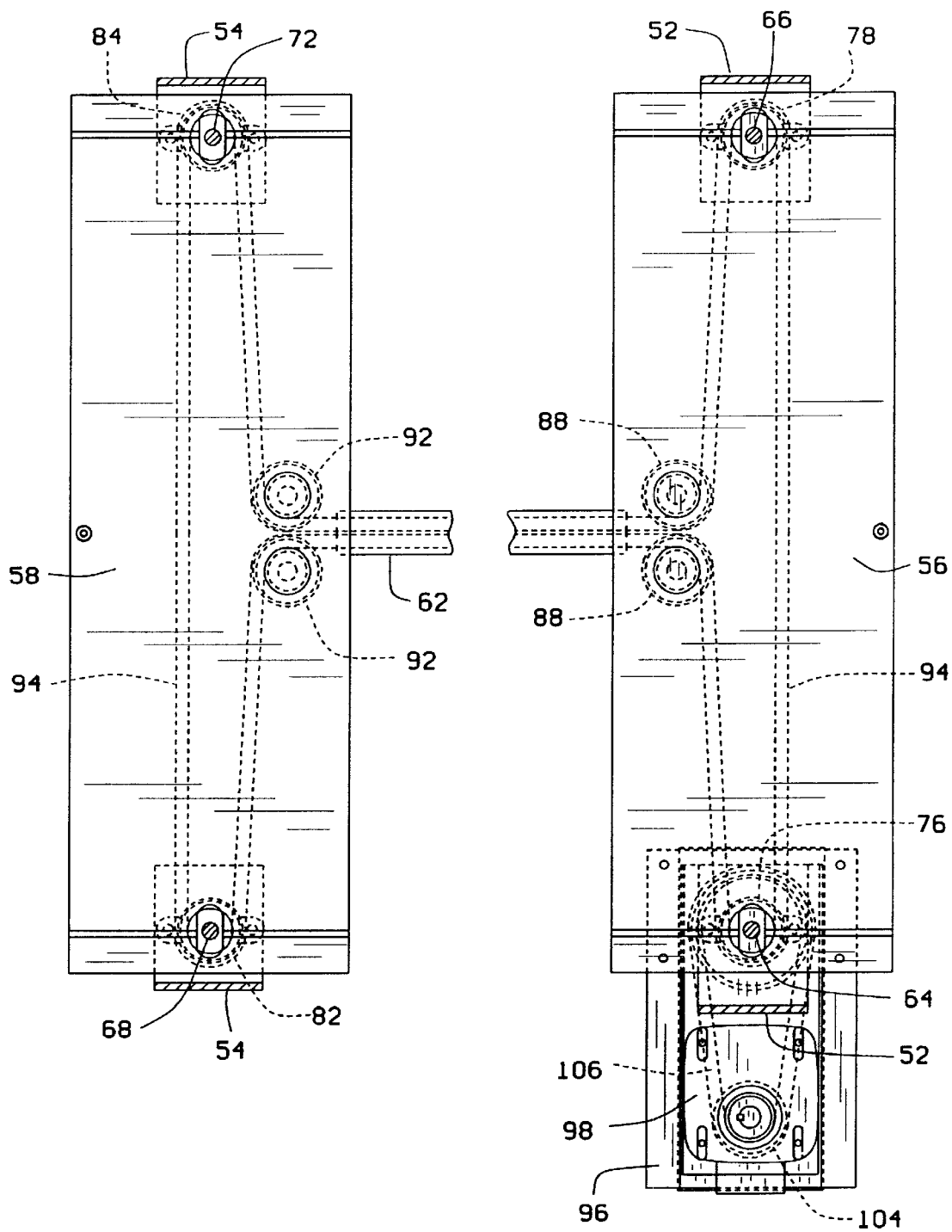
FIG. 4 is a fragmented plan view of one of the chain drive systems of the apparatus of FIG. 1.

The two axis guide rail change-over apparatus is supported by a frame that includes four struts 52, 54. The struts 52, 54 are arranged in pairs that are attached to the upstream end and downstream end of the air conveyor. FIG. 1 shows the upstream end of the air conveyor. FIGS. 3 and 4 show the upstream end of the air conveyor to the right in the figures, with the downstream end being shown to the left. Referring to the opposite ends of the air conveyor as upstream and downstream ends is done for this explanation only. It should be understood that the conveying path could be reversed without affecting the operation of the guide rail change-over apparatus.

The upstream pair of struts 52 are shown in FIG. 1. The construction of the downstream pair of struts 54 is the same as the upstream pair of struts 52. As seen in FIG. 1, the upstream pair of struts 52 have top ends that are bent laterally inwardly toward each other and are attached to the outer most side wall lower sections 22 of the conveyor channels 12 by threaded fasteners. The bottom ends of the struts 52, like their top ends, are also bent inwardly toward each other. An upstream cross-brace 56 seen in FIG. 4 is connected between the inwardly turned bottom ends of the pair of upstream struts 52 and a downstream cross-brace 58 is connected between the inwardly turned bottom ends of the pair of downstream struts 54. A tubular channel 62 extends longitudinally between the lateral center of the upstream cross-brace 56 and the downstream cross-brace 58. The tubular channel 62 is secured to the upstream cross-brace 56 and downstream cross-brace 58 at its longitudinally opposite ends. Together, the four struts 52, 54, the pair of cross-braces 56, 58 and the tubular channel 62 define a support frame that supports a vertical adjustment mechanism and a horizontal adjustment mechanism of the two axis guide rail change-over apparatus beneath the conveyor channels 12 of the air conveyor section. The vertical adjustment mechanism adjusts the vertical positions of the guide rails relative to the conveyor channels 12 and the horizontal adjustment mechanism adjust the horizontal positions of the guide rails relative to each other.

The vertical adjustment mechanism includes a pair of upstream vertical screw threaded rods 64, 66 and a pair of downstream vertical screw threaded rods 68, 72. The screw threading of all of the vertical rods is the same, for example, they are all right hand screw threaded. Each of the rods is supported at its opposite ends by bearing journals 74 attached to the opposite tops and bottoms of each of the upstream struts 52 and downstream struts 54. Thus, the bearing journals 74 support the rods in their vertical orientations and the rods are free to rotate in the bearing journals.

The two upstream rods 64, 66 have sprockets 76, 78 secured to the rods adjacent their bottom ends and the two downstream rods 68, 72 also have sprockets 82, 84 secure to the rods adjacent their bottom ends. One of the upstream rods 64 has an additional driven sprocket 86 secured to the rod adjacent its bottom end. Referring to FIG. 4, a pair of upstream take-up and routing sprockets 88 are mounted on the upstream cross-brace 56 adjacent the tubular channel 62. A pair of downstream pinion sprockets 92 are mounted on the downstream cross-brace 58 adjacent the tubular channel 62.

A loop of link chain 94 extends around the pair of upstream sprockets 76, 78, between the pair of upstream pinion sprockets 88, through the interior of the tubular channel 62, between the pair of downstream pinion sprockets 92 and around the pair of downstream sprockets 82, 84 as shown in FIG. 4. The length of link chain 94 functions as a portion of a drive system that simultaneously rotates the upstream sprockets 76, 78 and the downstream sprockets 82, 84 in the same direction and at the same speed of rotation. With the upstream sprockets 76,78 being secured to the upstream vertical screw threaded rods 64, 66 and the downstream sprockets 82, 84 being secured to the downstream vertical screw threaded rods 68, 72, driving the link chain 94 in one direction simultaneously rotates the four vertical screw threaded rods 64, 66, 68, 72 in the same direction and at the same speed of rotation. Reversing the drive of the link chain 94 to the opposite direction simultaneously rotates all of the four vertical screw threaded rods 64, 66, 68, 72 in the opposite direction.

A motor support plate 96 is secured to the underside of the upstream strut 52 adjacent the drive sprocket 86. An electric gear motor 98 is mounted on the motor support plate 96 with a drive shaft 102 of the gear motor projecting through the underside of the plate. A drive sprocket 104 is secured to the gear motor output shaft 102 and a small loop of chain 106 interconnects the drive sprocket 104 and the driven sprocket 86. Thus, controlling the electric gear motor 98 to rotate its output shaft 102 in a first direction is transmitted by the loop of chain 106 to the driven sprocket 86 of the one upstream vertical screw threaded rod 64, rotating the vertical rod in the same direction as the gear motor output shaft 102. This rotation of the upstream vertical screw threaded rod 64 is transmitted by the link chain 94 of the drive system to the other upstream vertical screw threaded rod 66 and to the pair of downstream vertical screw threaded rods 68, 72, causing all of the vertical screw threaded rods to rotate in the same direction and at the same speed. Reversing the direction of rotation of the gear motor output shaft 102 reverses the direction of rotation of all four of the vertical screw threaded rods.

Four internally screw threaded vertical adjustment blocks 112, 114, 116, 118 are mounted on the external screw threading of the four vertical screw threaded rods 64, 66, 68, 72, respectively. As an alternative, the blocks could have smooth internal bores and a brass nut could be attached to each block in alignment with the internal bore. The four vertical rods would then be screw threaded through the nut of each block. The internal screw threading of each of the blocks mates with the external screw threading of each of the screw threaded rods. Thus, rotating all four vertical screw threaded rods 64, 66, 68, 72 in one direction of rotation causes the vertical adjustment blocks 112, 114, 116, 118 to move together in a vertically upward direction, and reversing the rotation of all four of the vertical rods will cause all four of the blocks 112, 114, 116, 118 to move together in a vertical downward direction.

One of the upstream vertical adjustment threaded blocks 112 and downstream vertical adjustment threaded blocks 116 is secured to a longitudinal channel member 122 and the others of the upstream vertical adjustment threaded blocks 114 and downstream vertical adjustment threaded blocks 118 is secured to a second longitudinal channel member 124. The two longitudinal channel members 122, 124 and the four vertical adjustment threaded blocks 112, 114, 116, 118 together define a carrier for the horizontal adjustment mechanism of the two axis guide rail change-over apparatus.

The horizontal adjustment mechanism includes four, horizontal or lateral screw threaded rods 132, 134, 136, 138 that laterally traverse the pair of longitudinal members 122, 124. The lateral screw threaded rods are arranged in upstream and downstream pairs. The upstream pair of rods 132, 134 extend laterally parallel to each other and have their laterally opposite ends mounted in bearing journals in the pair of upstream vertical adjustment blocks 112, 114. The bearing journals permit the upstream pair of lateral rods 132, 134 to rotate freely. In a like manner, the downstream pair of lateral rods 136, 138 extend laterally parallel to each other and have their opposite ends mounted in bearing journals in the pair of downstream vertical adjustment blocks 116, 118. The bearing journals in the downstream vertical adjustment blocks 116, 118 permit the downstream pair of lateral rods 136, 138 to rotate freely. With each of the lateral rods having their opposite ends mounted in one of the vertical adjustment blocks which are, in turn, mounted on the four vertical screw threaded rods, rotating the four vertical screw threaded rods 64, 66, 68, 72 in one direction of rotation causes the four lateral screw threaded rods 132, 134, 136, 138 to move together vertically upwardly, and rotating the four vertical screw threaded rods 64, 66, 68,72 in the opposite direction causes the four lateral screw threaded rods 132, 134, 136, 138 to move together vertically downwardly.

One of the pair of upstream lateral rods 132 has right handed screw threading across its exterior and the other of the pair of upstream lateral rods 134 has left handed screw threading across its exterior. Also, one of the pair of downstream lateral rods 136 has right handed screw threading across its exterior and the other of the pair of downstream lateral rods 138 has left handed screw threading across its exterior.

A right handed internally screw threaded horizontal adjustment block 142 is mounted on the right handed screw threaded rod 132 of the upstream pair of rods and a left handed internally screw threaded horizontal adjustment block 144 is mounted on the left handed screw threaded lateral rod 134 of the upstream pair of rods. In a like manner, a right hand internally screw threaded horizontal adjustment block 146 is mounted on the right handed screw threaded lateral rod 136 of the downstream pair of rods and a left handed internally screw threaded horizontal adjustment block 148 is mounted on the left handed screw threaded lateral rod 138 of the downstream pair of rods. As an alternative to the internal screw threading of the horizontal blocks, the blocks could be hollow and have brass nuts mounted on their opposite ends with the nuts threaded on the lateral rods. The nuts are mounted loosely on the opposite ends of the blocks to permit some slight axial movement of the nuts which prevents binding of the pairs of nuts on the rods. Each of the horizontal adjustment blocks 142, 144, 146, 148 does not extend across the entire length of its associated lateral rod. This enables limited lateral movement of the horizontal adjustment blocks across their associated lateral rods in response to rotation of the rods. However, because one rod of each pair is right hand screw threaded and the other rod of each pair is left hand screw threaded, the horizontal adjustment blocks of each pair of rods will move in opposite lateral directions in response to rotating both rods of each pair in the same direction. Thus, turning both of the upstream pair of lateral screw threaded rods 132, 134 in the same direction will cause their associated horizontal adjustment blocks 142, 144 to move in opposite directions and turning the lateral screw threaded rods 136, 138 of the downstream pair in the same directions will also cause their associated horizontal adjustment blocks 146, 148 to move in opposite directions.

A link chain drive system interconnects each of the four lateral screw threaded rods. Referring to FIG. 3, the upstream pair of lateral screw threaded rods 132, 134 have sprockets 152, 154 secured to adjacent ends of the rods. The sprockets 152, 154 are connected together by a small loop of link chain 156. In a like manner, the downstream pair of lateral screw threaded rods 136, 138 also have sprockets 162, 164 secured to adjacent ends of the rods. These sprockets 162, 164 are also interconnected by a small loop of link chain 166. At the opposite ends of the pairs of lateral screw threaded rods, a drive sprocket 168 is secured to the right hand screw threaded rod 132 of the upstream pair of rods, and a driven sprocket 172 is secured to the left hand screw threaded rod 138 of the downstream pair. A loop of link chain 174 interconnects the drive sprocket 168 with the driven sprocket 172.

Referring to FIG. 3, a drive shaft 176 extends laterally across the pair of channel members 122, 124 and has its opposite ends mounted for rotation in bearing journals 178 secured to the channel members 122, 124. The drive shaft 176 is connected to an electric gear motor 184 by a drive transmission such as a worm gear transmission or a bevel gear transmission. The electric gear motor 184 is selectively controlled to rotate the drive shaft 176 in one direction that causes the horizontal adjustment blocks of each pair to move toward each other, or in a second opposite direction that causes the horizontal adjustment blocks of each pair to move away from each other. A drive sprocket 186 is secured to the drive shaft 176 and is connected by a loop of link chain 188 to a driven sprocket 192 secured to an end of the left hand lateral screw threaded rod 134 of the upstream pair of rods 132, 134. Thus, rotating the drive shaft 176 in one direction of rotation results in the pairs of upstream lateral screw threaded rods 132, 134 and the pair of downstream lateral screw threaded rods 136, 138 being rotated at the same speed and in the same direction of rotation. Reversing the rotation of the drive shaft 176 also reverses the rotation of the upstream pair of lateral screw threaded rods 132, 134 and the downstream pair of lateral screw threaded rods 136, 138.

Opposed pairs of guide rails 202, 204 are secured to the horizontal adjustment blocks with one guide rail 202 of each pair being secured to the left handed internal screw threaded blocks 144, 148 and the second guide rail 204 of each pair being secured to the right handed internal screw threaded blocks 142, 146. As best seen in FIGS. 1 and 3, the guide rails of each pair are mirror images of each other and are formed from longitudinally elongated plates. The bottom edges of each guide rail are bent inwardly and are secured to their respective horizontal adjustment blocks by threaded fasteners. The top edges 212, 214 of the guide rails are also bent slightly inwardly toward each other. The inwardly angled top edges 212, 214 are designed to contact bottles conveyed along the air conveyor to limit the lateral movement of the bottles as they are conveyed while minimizing the surface area of contact between the guide rails and the bottle and thereby minimize any slowing of the bottles speed when contact with the guide rails occurs. The top edges 212, 214 have a commercially available U-shaped extruded plastic covering pressed over the edges for soft contact with the bottles being conveyed. The inward bends of the top edges 212, 214 not only position the edges close to the opposite sides of the bottles being conveyed to limit their side-to-side movement, but is also useful in limiting forward and rearward rocking movement of certain types of conveyed bottles. For example, when the bottles being conveyed have an exterior surface with a portion that is contoured or curved inwardly toward the center of the bottle, the guide rails can be vertically and laterally adjustably positioned so that their inwardly angled top edges 212, 214 extend or project into the curvature of the bottle exterior. With the top edges 212, 214 projecting into the bottle curvature, any forward or rearward rocking of the bottle will cause the enlarged lower end of the bottle below the curved portion of its exterior surface to come into contact with the inwardly angled edges 212, 214. Thus, in this manner the inwardly angled edges 212, 214 also limit the extent of forward and rearward rocking movement of the bottles conveyed by the conveyor.

By mounting one of the guide rails 202 of each pair to the left handed screw threaded adjustment blocks 144, 148 at the opposite upstream and downstream ends of the conveyor section, and mounting the other guide rail 204 of each pair to the right handed screw threaded adjustment blocks 142, 146 at the opposite upstream end and downstream ends of the air conveyor section, controlling the operation of the electric gear motor 184 to rotate the drive shaft 176 in one direction adjustably positions the guide rails 202, 204 laterally toward each other, and operation of the gear motor 184 to rotate the drive shaft 176 in a second opposite direction adjustably positions the guide rails 202, 204 laterally away from each other. In FIG. 1, the pairs of guide rails 202, 204 are shown in full lines in their first adjusted positions where the lateral spacing between the pairs of guide rails is its greatest. Also in FIG. 1, a pair of guide rails 202', 204' is shown in broken lines in its second laterally adjusted position where the guide rails are positioned laterally closest to each other. Because the pairs of guide rails are mounted by their blocks 142, 144, 146, 148 on the pairs of lateral rods 132, 134, 136, 138 that, in turn, are mounted on the blocks 112, 114, 116, 118 of the longitudinal channel members 122, 124, selective operation of the vertical adjustment gear motor 98 to rotate its output shaft in one direction results in the pairs of guide rails being vertically positioned upwardly, and operation of the vertical adjustment gear motor 98 to rotate its output shaft in a second opposite direction results in the pairs of guide rails being vertically positioned downwardly relative to the air conveyor channels 12.

If desired, a counter 216 can be mounted on one of the lateral screw threaded rods 134 and can be calibrated so that it displays a numerical value representative of the lateral spacing between the pairs of guide rails 202, 204. In a like manner, a second counter 218 can be mounted on one of the vertical screw threaded rods 64 and can be calibrated to give a numerical display representative of the vertical position of the guide rails relative to the air conveyor slots 28.

Although electric gear motors 98, 184 are described above as being employed in the preferred embodiment for driving the vertical screw threaded rods and the lateral screw threaded rods, these gear motors can be replaced by hand cranks 222, 224 as shown in FIG. 2.

The two axis guide rail change over apparatus described above provides an apparatus that is capable of simultaneously adjusting the lateral spacing between adjacent guide rails of an air conveyor having one or more conveyor channels and/or simultaneously adjusting the vertical positions of the guide rails relative to the air conveyor without requiring a substantial down time of the conveyor.

FIGS. 6 and 7 show an embodiment of a guide rail 302 that includes an improvement over the guide rails 202, 204 described earlier. Like the previously described guide rails, the modified guide rail 302 is employed in pairs of guide rails that are mirror images of each other. Also like the previously described guide rails, the modified guide rail 302 is constructed as an elongate, generally flat plate having a length with opposite upstream 304 and downstream 306 edges and opposite top 308 and bottom 312 edges. The upstream and downstream edges 304, 306 are parallel to each other and the top and bottom edges 308, 312 are parallel to each other giving the guide rail 302 a rectangular configuration. As in the previously described embodiment of the guide rail, a majority of the body 314 of the guide rail is positioned in a single vertical plane 316 when in use. The bottom edge 312 of the guide rail is bent perpendicular to the single plane 316 of the guide rail body 314. In use, the bottom edges 312 of each pair of guide rails project toward each other. As in the first described embodiment of the guide rails, the top edges 308 of the guide rails are also bent inwardly toward each other. The top edges 308 also have the commercially available U-shaped extruded plastic covering pressed over the edges for soft contact with the bottles being conveyed. FIG. 6 shows a flat guide rail prior to the top and bottom edges being bent and FIG. 7 shows the guide rail of FIG. 6 after the top and bottom edges have been bent.

The modified guide rails 302 differ from the previously described guide rails in that they are provided with a plurality of openings 322. The openings 322 are spacially arranged along the length of the guide rails between the top and bottom edges and between the upstream and downstream edges of the guide rails. It has been observed in use of the first described embodiment of the guide rails that as a body of a bottle is conveyed between the guide rail plates, the bottle pushes the air between the plates before the body of the bottle. This has a tendency to cause the body of the bottle to angle rearwardly as the bottle neck is conveyed along the slot of the air conveyor. This could lead to jamming of the bottle in the air conveyor. To overcome this problem the modified guide rails 302 of the invention have pluralities of openings 322 along the lengths of the guide rails that allow the air to escape from between the pair of opposed guide rails. In the preferred embodiment, the plurality of openings 22 are rectangular and are of a common size. However, the openings 322 can have any shape to accomplish the purpose of allowing air to escape from between an opposed pair of guide rails. This is demonstrated by the group of openings 324 toward the center of the guide rail 302 of FIG. 6 that are formed to display the trademark OMS$_{TM}$ of the guide rail manufacturer.

While the present invention has been described by reference to a specific embodiment, it should be understood that modifications and variations of the invention may be constructed without departing form the scope of the invention defined in the following claims.

What is claimed:

1. An air conveyor guide rail comprising:

an elongate plate having top and bottom edges and upstream and downstream edges, a plurality of openings through the plate within the top, bottom, upstream and downstream edges of the plate for allowing a free flow of air through the plate, and attachment means for attaching the plate to the air conveyor;

the plurality of openings being positioned in a single plane; and, the plate having a bend along the bottom edge of the plate that positions the bottom edge of the plate in a plane that is oriented at an angle relative to the single plane in which the plurality of openings are positioned, the attachment means being formed between the bottom edge and the bend.

2. An air conveyor guide rail comprising:

an elongate plate having top and bottom edges and upstream and downstream edges, a plurality of openings through the plate within the top, bottom, upstream and downstream edges of the plate for allowing a free flow of air through the plate, and attachment means for attaching the plate to the air conveyor;

the plurality of openings being positioned in a single plane; and, the plate having a bend along the top edge of the plate that positions the top edge of the plate in a plane that is oriented at an angle relative to the single plane in which the plurality of openings are positioned.

3. The air conveyor guide rail of claim 2, wherein:

the plurality of openings are spacially arranged along a length of the plate.

4. The air conveyor guide rail of claim 2, wherein:

each opening of the plurality of openings has a rectangular shape.

5. The air conveyor guide rail of claim 2, wherein:

each opening of the plurality of openings has a common shape.

6. The air conveyor guide rail of claim 1, wherein:

the plate has a bend along the top edge of the plate that positions the top edge of the plate in a plane that is oriented at an angle relative to the single plane in which the plurality of openings are positioned and the plane in which the bottom edge is positioned.

7. An air conveyor guide rail comprising:

an elongate plate having top and bottom edges and upstream and downstream edges, a plurality of openings through the plate within the top, bottom, upstream and downstream edges of the plate for allowing a free flow of air through the plate, and attachment means for attaching the plate to the air conveyor; and, the top and bottom edges of the plate being parallel to each other and the upstream and downstream edges of the plate being parallel to each other.

8. Air conveyor guide rails comprising:

a pair of elongated plates, each plate having top and bottom edges and upstream and downstream edges, a plurality of openings through each plate within the top, bottom, upstream and downstream edges of each plate for allowing a free flow of air through the plate, and attachment means for attaching the plate to the air conveyor;

the pair of plates being mirror images of each other.

9. The air conveyor guide rails of claim 8, wherein:

each plate has a length between its upstream and downstream edges and the plurality of openings of each plate are spatially arranged along the length of each plate.

10. Air conveyor guide rails comprising:

a pair of elongated plates, each plate having top and bottom edges and upstream and downstream edges, a plurality of openings through each plate within the top, bottom, upstream and downstream edges of each plate for allowing a free flow of air through the plate, and attachment means for attaching the plate to the air conveyor;

the plurality of openings of each plate being positioned in a single plane; and, each plate having a bend along the bottom edge of the plate that positions the bottom edge of the plate in a plane that is oriented at an angle relative to the single plane in which the plurality of openings are positioned, the attachment means being formed between the bottom edge and the bend.

11. The air conveyor guide rails of claim 8, wherein:

each opening of the plurality of openings has a rectangular configuration.

12. The air conveyor guide rails of claim 8, wherein:

each opening of the plurality of openings has a common shape.

13. Air conveyor guide rails comprising:

a pair of elongated plates, each plate having top and bottom edges and upstream and downstream edges, a plurality of openings through each plate within the top, bottom, upstream and downstream edges of each plate for allowing a free flow of air through the plate, and attachment means for attaching the plate to the air conveyor;

the plurality of openings of each plate being positioned in a single plane; and, each plate having a bend along the top edge of the plate that positions the top edge in a plane that is oriented at an angle relative to the single plane in which the plurality of openings are positioned.

14. The air conveyor guide rails of claim 10, wherein:

each plate has a bend along the top edge of the plate that positions the top edge in a plane that is oriented at an angle relative to the single plane in which the plurality of openings of each plate are positioned and relative to the plane in which the bottom edge of each plate is positioned.

15. Air conveyor guide rails comprising:

a pair of elongated plates, each plate having top and bottom edges and upstream and downstream edges, a plurality of openings through each plate within the top, bottom, upstream and downstream edges of each plate for allowing a free flow of air through the plate, and attachment means for attaching the plate to the air conveyor;

the top and bottom edges of the pair of plates being parallel to each other and the upstream and downstream edges of the pair of plates being parallel to each other.

* * * * *